(12) United States Patent
Davidson

(10) Patent No.: US 6,208,529 B1
(45) Date of Patent: *Mar. 27, 2001

(54) ZERO VOLTAGE SWITCHING BUCK DERIVED CONVERTER

(75) Inventor: Christopher Donovan Davidson, Surrey (CA)

(73) Assignee: Argus Technologies Ltd., Burnaby (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/324,556

(22) Filed: Jun. 2, 1999

(30) Foreign Application Priority Data

May 3, 1999 (CA) .................................................. 2270816

(51) Int. Cl.⁷ .................................................. H02M 3/335

(52) U.S. Cl. .............................................. 363/17; 363/132

(58) Field of Search .................................. 363/17, 132, 98

(56) References Cited

U.S. PATENT DOCUMENTS

| | | | |
|---|---|---|---|
| 4,559,590 | 12/1985 | Davidson | 363/21 |
| 4,796,173 | * 1/1989 | Steigerwald | 363/25 |
| 5,126,931 | 6/1992 | Jitaru | 363/21 |
| 5,438,497 | * 8/1995 | Jain | 363/17 |
| 5,568,373 | * 10/1996 | Small | 363/132 |
| 5,715,155 | * 2/1998 | Shahani et al. | 363/132 |

OTHER PUBLICATIONS

C. Van Velthooven, "The Forward Converter In Switched–Mode Power Supplies", Jul. 1975, Philips Application Information #474 pp. 3–21.

Bruce Carsten, "Converter Component Load Factors; A Performance Limitation of Various Topologies", PCI '88 Munich, W. Germany, Dec. 88 pp. 1–19.

R.J. Haver, "Switched Mode Power Supplies–Highlighting A 5–V, 40–A Inverter Design", Motorola Application Note #AN–737. Dec. '74, pp. 1–15.

Bruce Carsten, "High Power SMPS Require Intrinsic Reliability", PCI '81 Munich, W. Germany, Sep. 1981, pp. 118–132.

Ramesh Origanti et al., "Soft Switched DC–DC Converter with PWM Control", Intelec '93, Paris, France, Sep. 1993, pp. 341–349.

Barbi et al., "DC/DC Converter for High Input Voltage, Four Switches with Peak Voltage of Vin/2, Capacitive Turn–Off Snubbing; and Zero–Voltage Turn–On", PESC '98, Fukuoka, Japan, May 1998, pp. 1–7.

Peter N. Wood, "Design of a 5Volt, 1000 Watt Power Supply", Feb. 1976, TRW Power Semiconductors Application Note #122A, pp. 1–16.

Richard Redl, "Insulated–Gate–Transistor Drivers for Soft–Switching Converters, Synchronous Rectifiers, and ZVS/ZCS Active Snubbers" APEC '94, Orlando, FL, Feb. 1994, pp. 493–498.

(List continued on next page.)

Primary Examiner—Shawn Riley
(74) Attorney, Agent, or Firm—Natan Epstein Beehler & Pavitt

(57) ABSTRACT

A buck derived isolated DC-DC converter includes a half or full bridge of switching devices which are asymmetrically controlled so that top and bottom switches are opened and closed at mutually exclusive times. Primary side and secondary side DC blocking capacitor(s) and a small valued inductor are placed in series with an isolation transformer. A single secondary rectification uncontrolled switch and inductor-capacitor output filter are included. Additionally a voltage clamping circuit is added across the rectifier which includes an active switch which also may be connected to a tap on the output inductor.

23 Claims, 12 Drawing Sheets

OTHER PUBLICATIONS

Ionel Dan Jitaru, "High Efficiency DC–DC Converter", APEC '94, Orlando, FL, Feb. 1994, pp. 638–644.

Dongyan Zhou et al., "A Three–Switch High–Voltage Converter", APEC '95, Dallas, TX, Mar. 1995, pp. 283–289.

Wei Chen et al., "Design of High Efficiency, Low Profile, Low Voltage Converter with Integrated Magnetics", APEC '97, Atlanta, GA, Feb. 1997, pp. 911–917.

F.F. Linera et al., "Closing the Feedback Loop in the Half–Bridge Complementary–Control DC–to–DC Converter", APEC '97, Atlanta, GA, Feb. 1997, pp. 977–981.

Richard Redl, "A new Family of Zero–Voltage–Switching DC/DC Converters: Topologies, Analyses, and Extensions", PCIM '97, Neurenberg, Germany, Jun. 1997, pp. 105–110.

F.F. Linera et al., "A Novel Feedforward Loop Implementation for the Half–Bridge Complementary–Control Converter", APEC '98, Anaheim, CA, Feb. 1998, pp. 363–368.

Hengchun Mao et al., "Active Snubbers to Eliminate Diode Reverse Recovery and Achieve Zero–Current Turn–Off in DC–DC Converters", Intelec '98, San Francisco, CA, Oct. 1998, pp. 49–54.

Yuri Panov et al., "Performance Evaluation of 70–W Two–Stage Adapters for Notebook Computers", APEC '99, Dallas, TX, Apr. 1999, pp. 1056–1065.

Leonid Krupskiy et al., "Unified Model of the Asymmetrical Half–Bridge converter for Three Important Topological Variations", Intelec '99, Copenhagen, Denmark, Jun. 1999, pp. 1–8.

Jurie Dekter et al., "Lossless Active Clamp for Secondary Circuits", Intelec '98, San Francisco, Ca, Oct. 1998. pp. 386–391.

Hengchun Mao et al., "Active Snubbers to Eliminate Diode Reverse Recovery and Achieve Zero–Current Turn–Off in DC–DC Converters", Intelec '98, San Francisco, CA, Oct. 1998. pp. 49–54.

Yuri Panov et al., "Performance Evaluation of 70–W Two–Stage Adapters for Notebook Computers", APEC '99, Dallas, TX, Apr. 1999. pp. 1056–1065.

Leonid Krupskiy et al., "Unified Model of the Asymmetrical Half–Bridge converter for Three Important Topological Variations", Intelec '99, Copenhagen, Denmark, Jun. 1999. pp. 1–8.

* cited by examiner

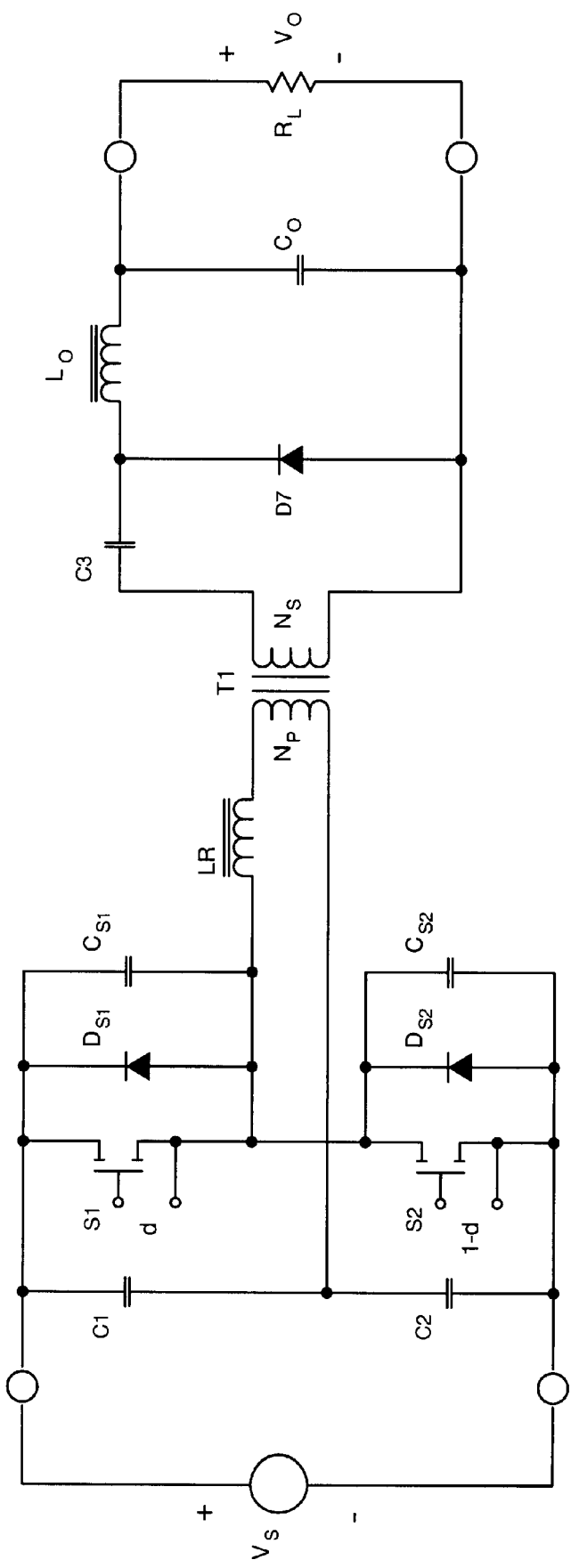
FIGURE 1 HALF BRIDGE VERSION

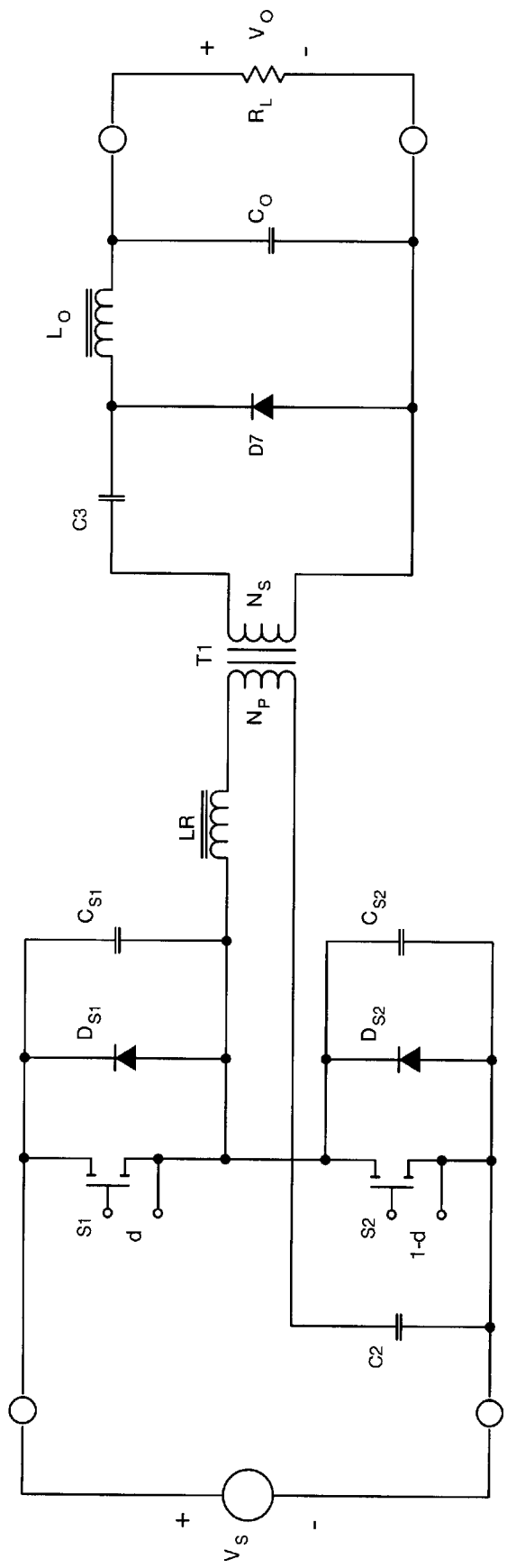
FIGURE 1A HALF BRIDGE VERSION

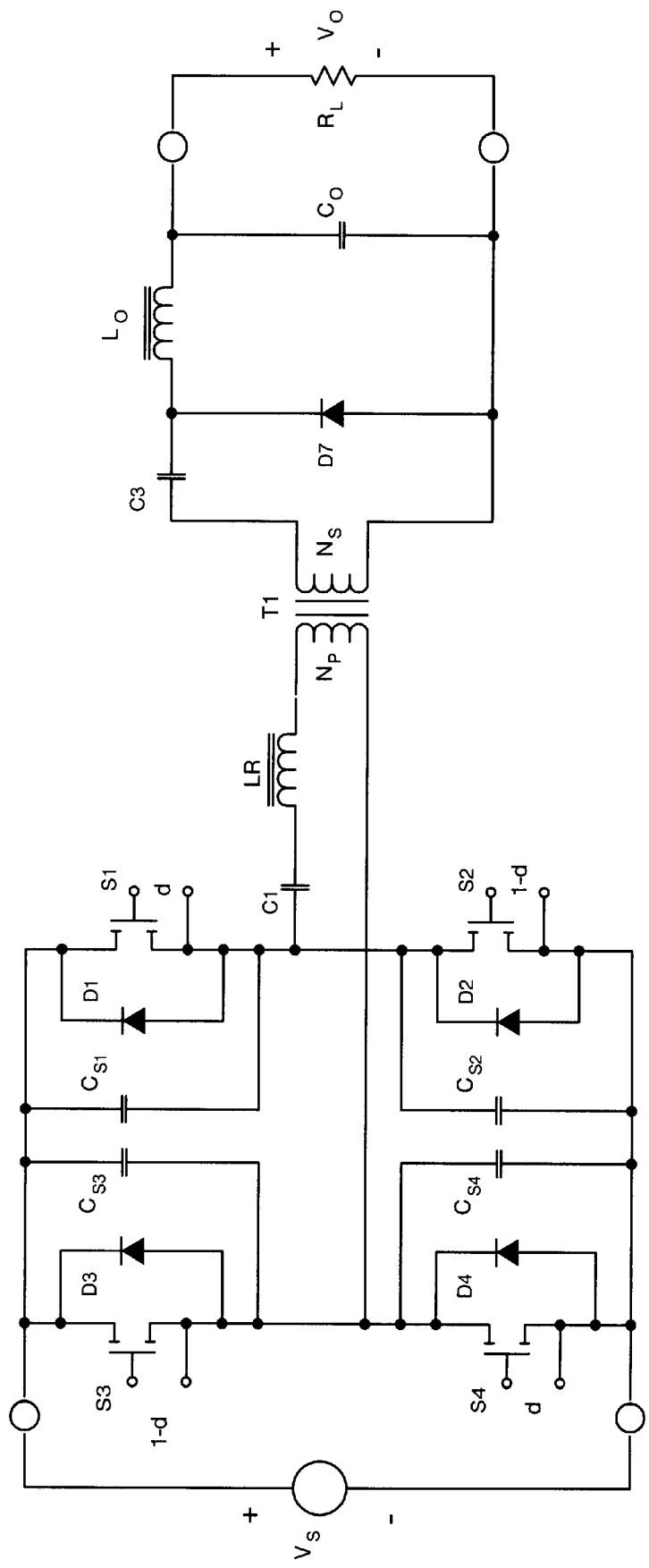
FIGURE 2 FULL BRIDGE VERSION

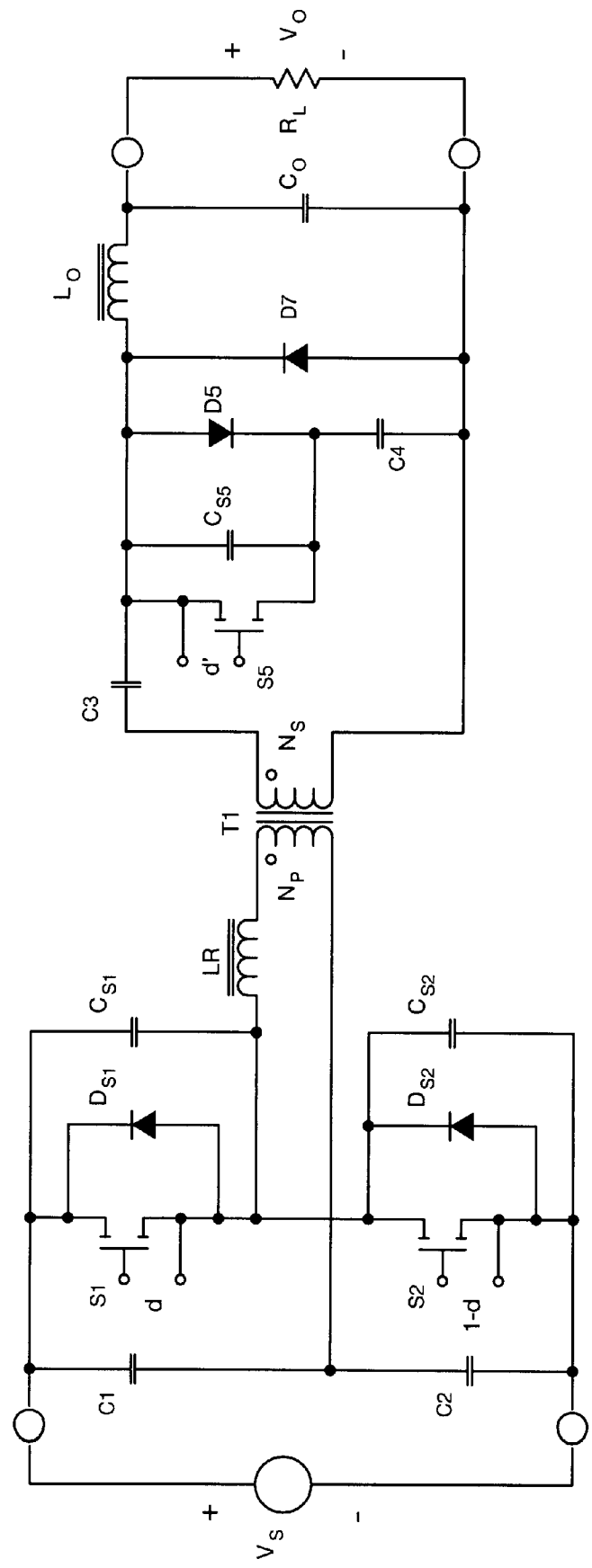
FIGURE 3 HALF BRIDGE WITH VOLTAGE CLAMP

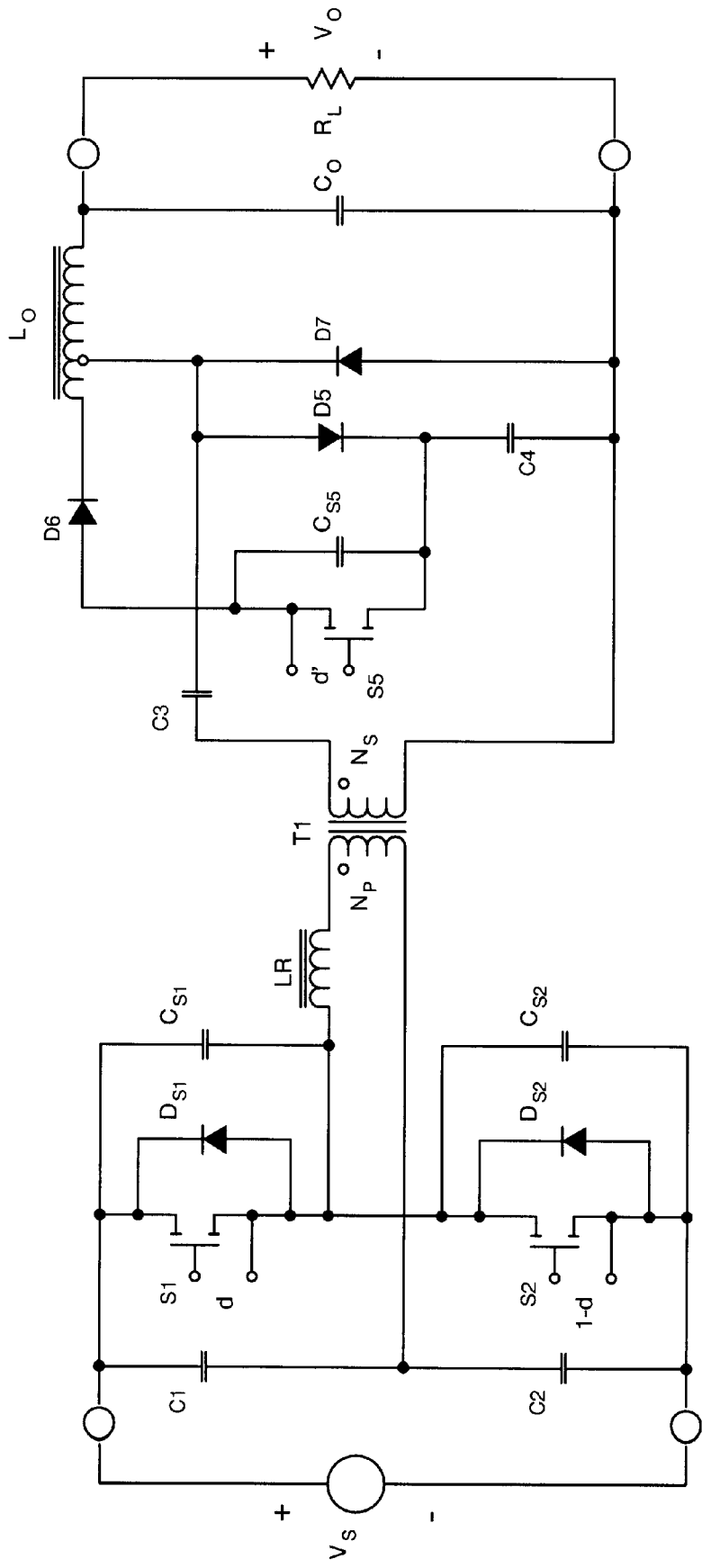
FIGURE 4 HALF BRIDGE WITH TAP UP VOLTAGE CLAMP

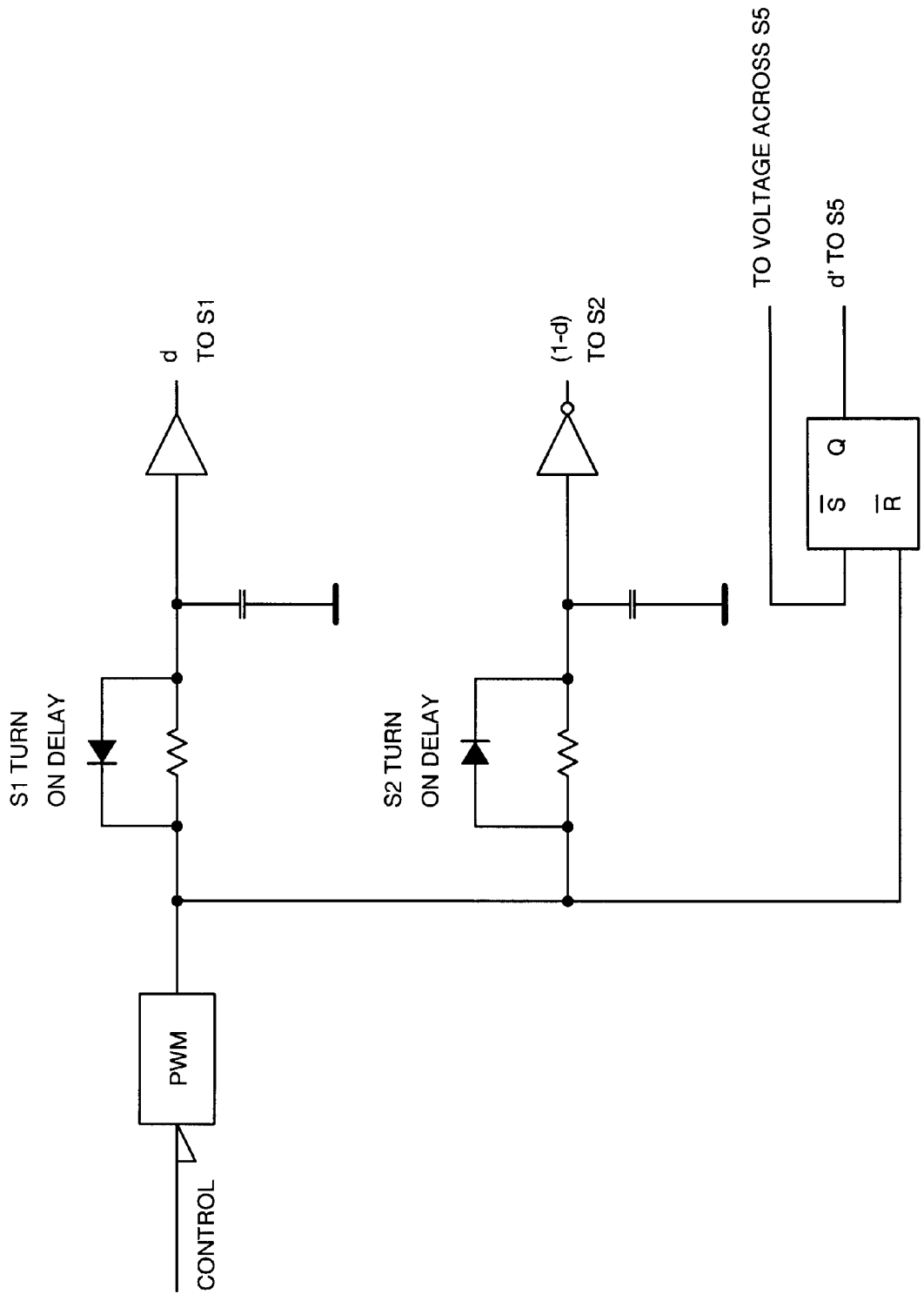

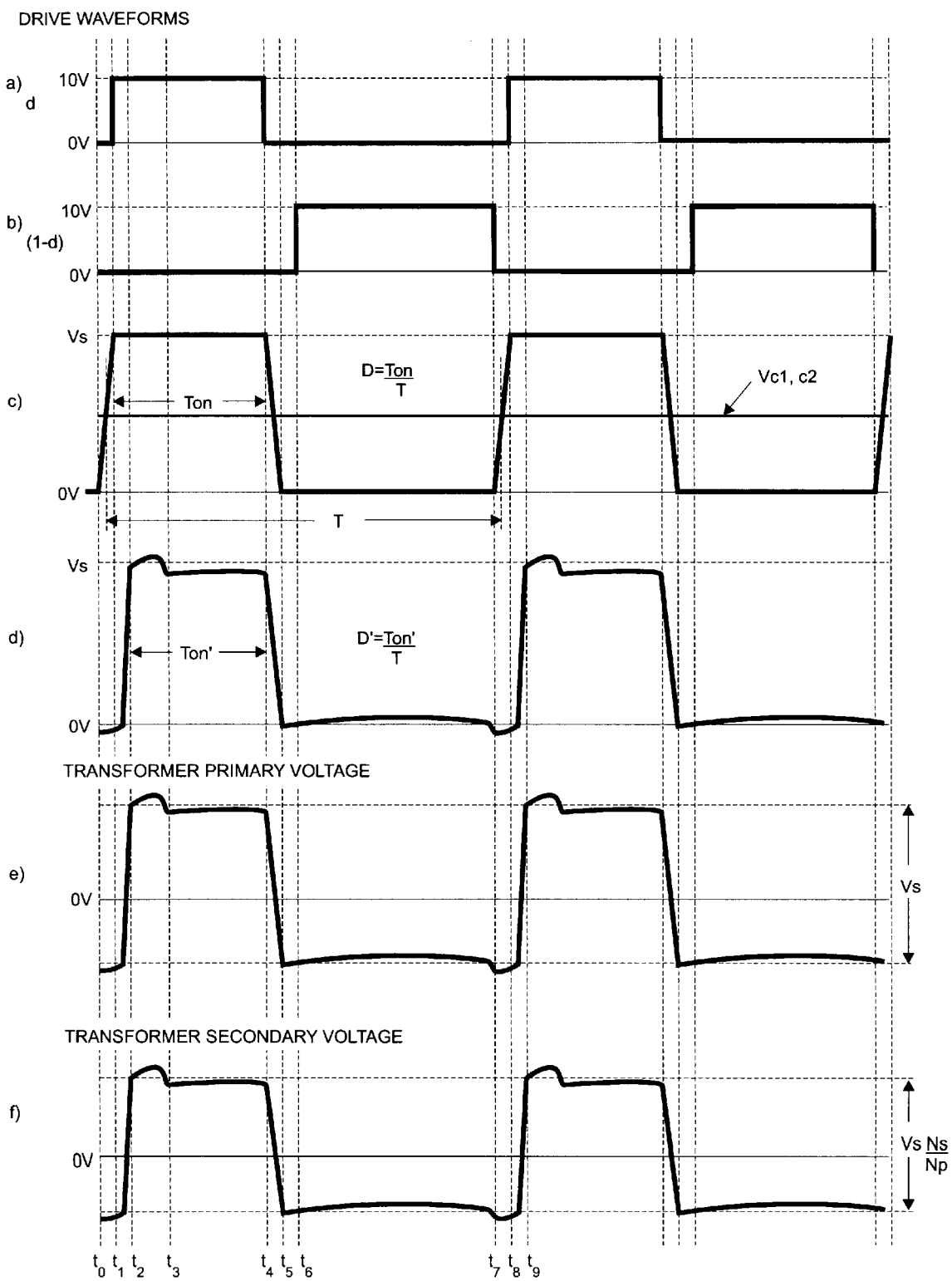

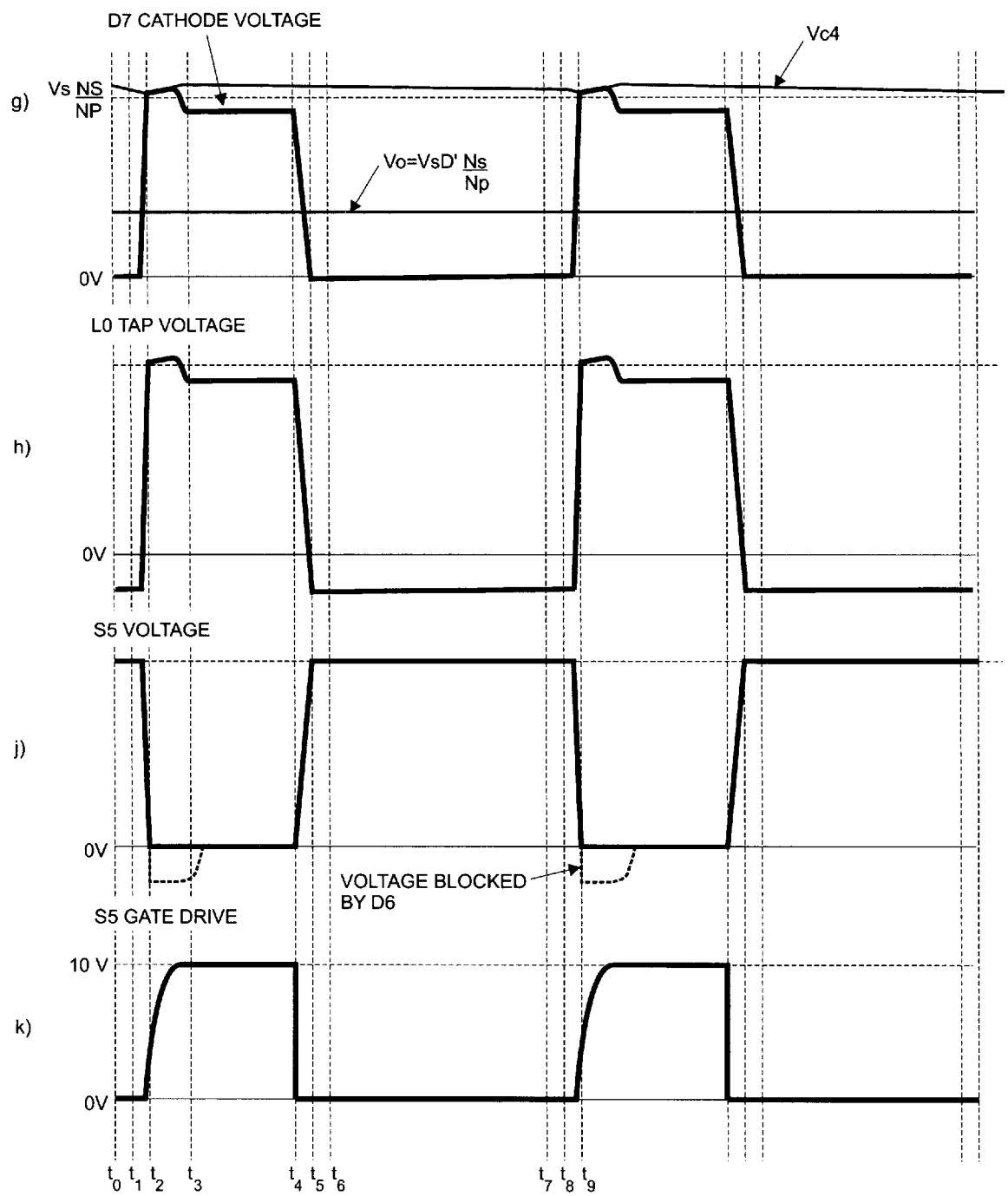

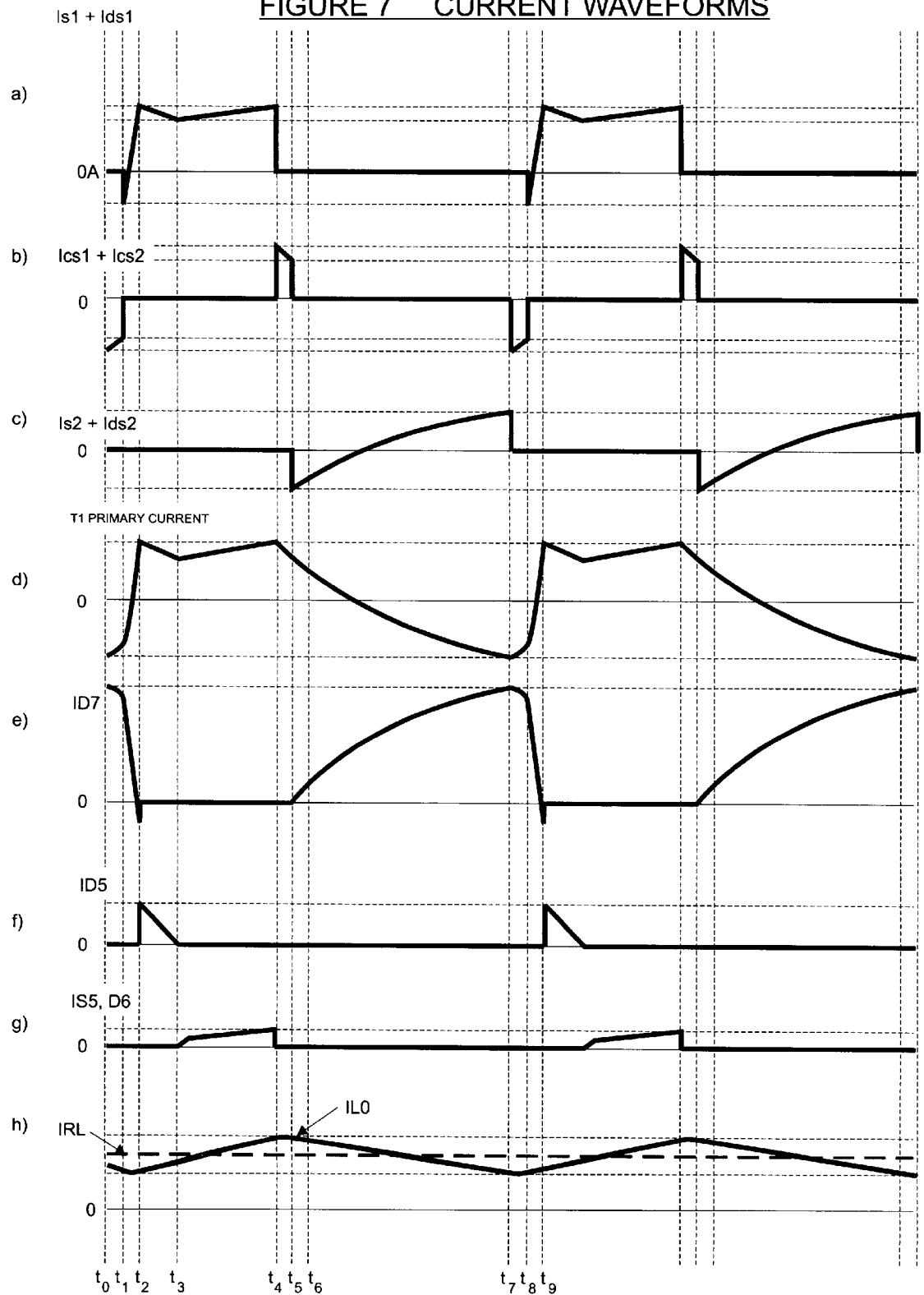

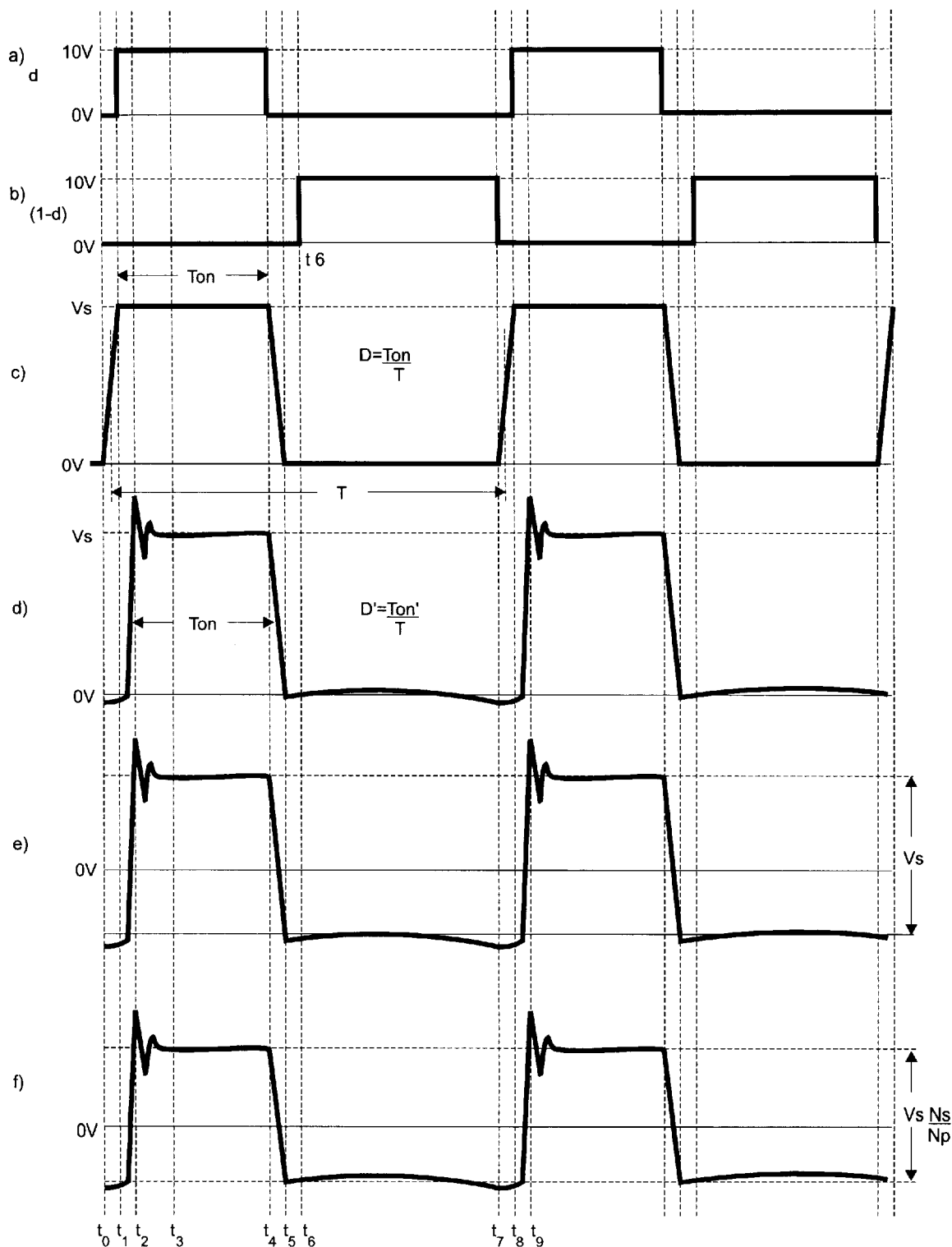
FIGURE 8 VOLTAGE WAVEFORMS FOR BASIC VERSION

D7 CATHODE AND OUTPUT VOLTAGE

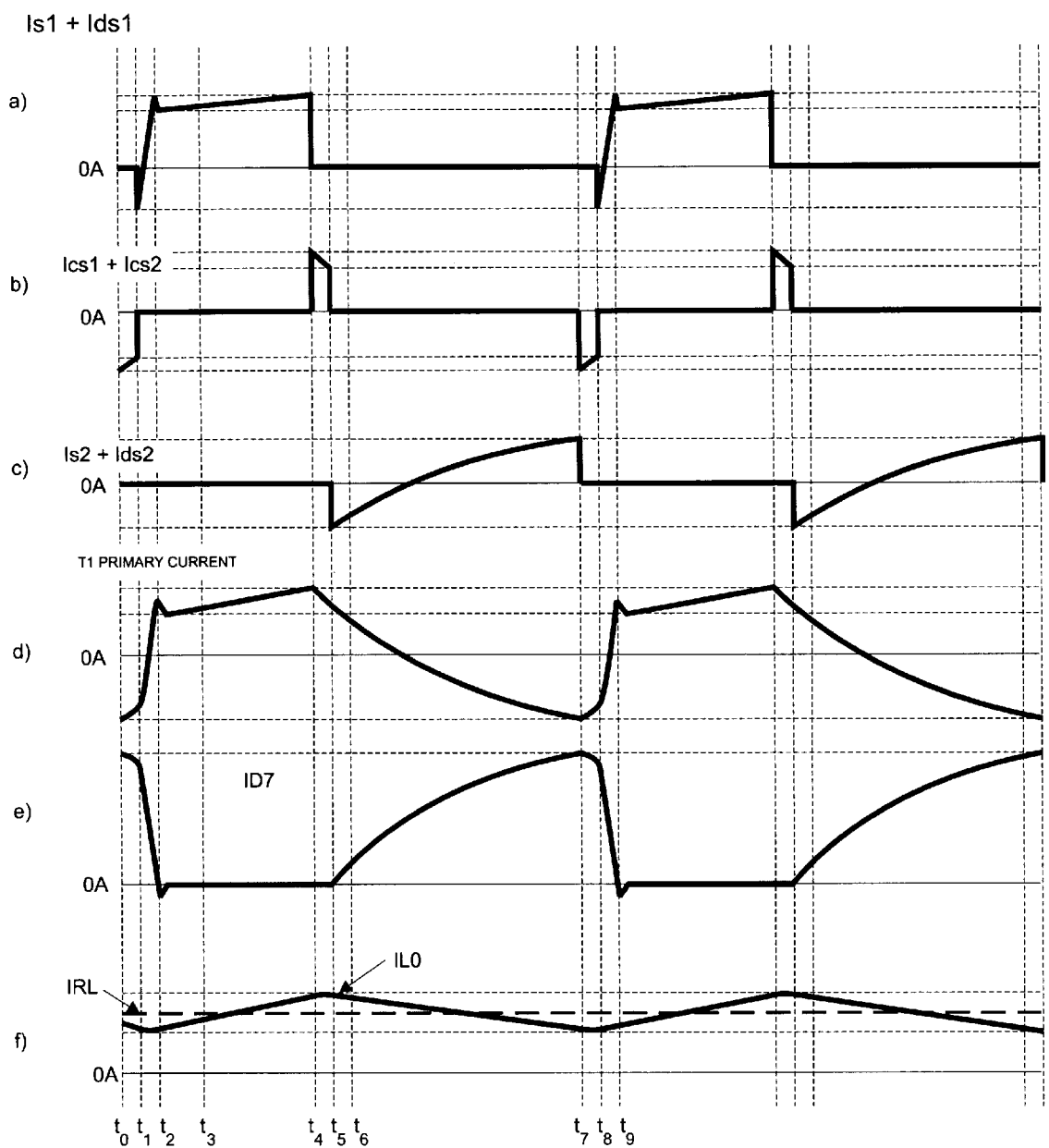

ZERO VOLTAGE SWITCHING BUCK DERIVED CONVERTER

TECHNICAL FIELD OF THE INVENTION

The present invention relates generally to isolated DC-DC converters and more particularly to buck derived converters which feature zero voltage switching of the controlled power switches and zero current switching of the non-controlled switches.

BACKGROUND OF THE INVENTION

DC to DC converters are frequently used to convert DC voltage, provide galvanic isolation of the output from the input, and to regulate the output. DC to DC converters are also frequently used as a portion of AC to DC power supplies. For example such power'supplies are employed in Telecommunication or Cellular Power Systems to provide isolated 24 Volt or 48 Volt power to the system batteries and paralleled load. DC to DC converters are also frequently used to convert and isolate one DC voltage from another. For example, +24 Volt cellular site power is converted to −48 Volt for co-located telecommunications equipment by using DC/DC converters.

Of the many topologies that can be used for DC-DC converters, those that are buck derived are often preferred for medium (+24 V, 48 V) and low (5 V, −3 V) voltage outputs. This is due to the non-pulsating output current and ease of control as the output voltage is directly proportional to the duty cycle of the switching devices. A common buck derived converter is the forward converter discussed in "The Forward Converter in Switched-Mode Power Supplies", Philips Application Note #474, Jul. 4, 1975. This converter features good component load factors (see "Converter Component Load Factors, A Performance Limitation of Various Topologies" Bruce Carsten, PCI'88 Munich, Germany), relative simplicity, ease of control and non pulsing output current. Another buck derived converter is the half bridge exemplified in "Switched Mode Power Supplies—Highlighting a 5 V 40A Inverter Design", Motorola Application Note #AN-737, 1974. This converter is more complex with 2 primary power switches, and has the disadvantage of 2 output windings, in the power transformer. Other commonly used buck derived converters are the full bridge PWM controlled and the phase shifted bridge converters. The component load factor of the forward converter was improved with the use of an active reset switch as disclosed in "High Power SMPS Require Intrinsic Reliability", Bruce Carsten, PCI'81 Proceedings pp. 118 to 133, Munich, Germany, September 1981.

One objective in designing a DC-DC converter is to achieve low switching losses and low EMI. This can be achieved by adding capacitors across the primary power switches and by operating the circuit in such a way to bring the voltage across them to zero before turning them on. This approach was disclosed in Jitaru U.S. Pat. No. 5,126,931 in the active reset forward converter by adding a saturable reactor, or third controlled switch, in series with the output winding of the transformer and reducing the magnetizing inductance of the transformer to allow the voltage of the main switch to ring down to zero before it is turned on.

Another class of DC/DC converters use asymmetrically controlled half bridge or full bridge switches, where either switch is on except during the switching times and the output is controlled by the relative duty cycle of the switches. Examples of such a converter are described in "Soft-Switched DC/DC Converter with PWM Control", Ramesh Origanti et al, Proceedings of Intelec 93 Paris, France September '93. The first is similar to a flyback (buck/boost) converter. The second is somewhat similar to a buck derived converter but has a non-linear parabolic transfer function with maximum output at 50% duty cycle and would be difficult to control. Another such converter topology is described in "DC/DC Converter for High Input Voltage, For Switching with Peak Voltage of Vin/2, Capactive turn off Snubbing and Zero Voltage Turn on", I. Barbi et al, PESC '98 Fukuoka, Japan May '98, and is similar to a phase shifted full bridge converter. This converter topology suffers from substantial extra current in the transformer windings when both half bridge sides are switched to the same input voltage. This circuit will have a poor transformer load factor except at 50% (full) duty cycle.

It is accordingly an object of the invention to provide a new and improved DC-DC converter most suitable for medium output voltages such as 24 Volts or 48 Volts DC.

An additional object of the invention is to provide a DC-DC converter with an isolated output which is proportional to the control duty cycle, and has a non-pulsating output current. A further object of the invention is to provide zero voltage switching of the controlled power switches (e.g. MOSFETS) and zero current switching of the output non-controlled switch (e.g. a diode) to maximize conversion efficiency and minimize EMI, without using an additional switch in series with the output. Another object of the invention is to provide a DC-DC converter with high component load factor for the switching devices and especially the transformer to minimize size and cost.

SUMMARY OF THE INVENTION

In one of its aspects the invention consists of a switch mode DC to DC converter comprising a half bridge or full bridge arrangement of asymmetlically controlled switches at the input stage, at least one capacitor in series with the primary winding, and an output stage including a series combination of a secondary DC blocking capacitor and the secondary winding, one end of the series combination being connected to an output inductor, and an output diode connected across the series combination.

The primary half bridge stage may be realized by two controlled switches in series with one another, the series combination being in parallel with the input terminals. Antiparallel diode means are associated with each switch and are poled to allow current to flow in a direction opposite to the normal direction of current flow in each switch. An inductor is in series with the primary winding and at least one primary DC blocking capacitor, the series combination of the inductor, primary winding and primary DC blocking capacitor being connected between one of the input terminals and the common point of said two controlled switches.

The primary DC blocking capacitor may in fact be two capacitors such that each capacitor is connected to one of the input terminals.

The primary stage may also be realized as a full bridge arrangement of switches. Two asymmetrically controlled switches are connected in series with one another and in parallel with the input terminals and with a further two asymmetrically controlled switches which are also connected in series with one another. Antiparallel diode means are associated with each switch and are poled to allow current to flow in a direction opposite to the normal direction of current flow in each switch. An inductor is in series with the primary winding and a primary DC blocking capacitor, the series combination of the inductor, primary winding and primary DC blocking capacitor being connected between the common point of the first two controlled switches on the one hand and the common point of the further two controlled switches on the other hand.

In another aspect, the invention comprises a clamp diode means and a clamping capacitor connected in series across the output diode. The clamp diode is poled to conduct opposite to the normal direction of current flow when the switch is ON. A controlled energy recovery switch is connected across the clamp diode means and is poled to conduct current in the opposite direction to the normal direction of current in the clamp diode means when the controlled switch is turned ON.

In another aspect of the invention, a converter with a half bridge or full bridge primary stage includes an output stage including a secondary DC blocking capacitor in series with the secondary winding, one end of the series combination being connected to a tap on an output inductor, and an output diode connected across the combination of the secondary winding and the secondary DC blocking capacitor. A clamping capacitor is in series with a diode and that series combination is connected across the output diode. One end of the diode is connected to the tap and is poled to conduct current in the opposite direction to the direction of current flow in the output diode. A controlled energy recovery switch is in series with second diode means, said series combination of energy recovery switch and second diode means being connected from the common point between said first diode means and said clamping capacitor on the one hand and the output inductor on the other hand, both said energy recovery switch and said second diode means being poled to conduct current from the clamping capacitor to the output inductor when said energy recovery switch is ON.

Other aspects of the invention are not described above but are detailed in the following description of the preferred embodiments and in the claims.

BRIEF DESCRIPTION OF THE DRAWINGS

FIG. 1 is a circuit diagram of one embodiment of the invention having a half bridge primary switching circuit;

FIG. 1A is a circuit diagram of another embodiment of the invention having a half bridge primary switching circuit and a single capacitor for blocking DC in the primary winding;

FIG. 2 is a circuit diagram of a second embodiment of the invention having a full bridge primary switching circuit;

FIG. 3 is a circuit diagram of the half bridge version of invention with a voltage clamp on the output diode using an active switch;

FIG. 4 is a circuit diagram of the half bridge version with a voltage clamp on the output diode using a tap in the output inductor, a series diode and the active switch;

FIG. 5 is a circuit diagram showing a typical gate driving circuit that would be used with the invention;

FIG. 6 is a set of voltage waveforms of the embodiment of the invention of FIG. 4 operated at full load;

FIG. 7 is a set of current waveforms of the embodiment of the invention of FIG. 4 operated at full load.

FIG. 9 is a set of current waveforms of the embodiment of the invention of FIG. 1.

DETAILED DESCRIPTION OF THE PREFERRED AND OTHER EMBODIMENTS

Figure 8:
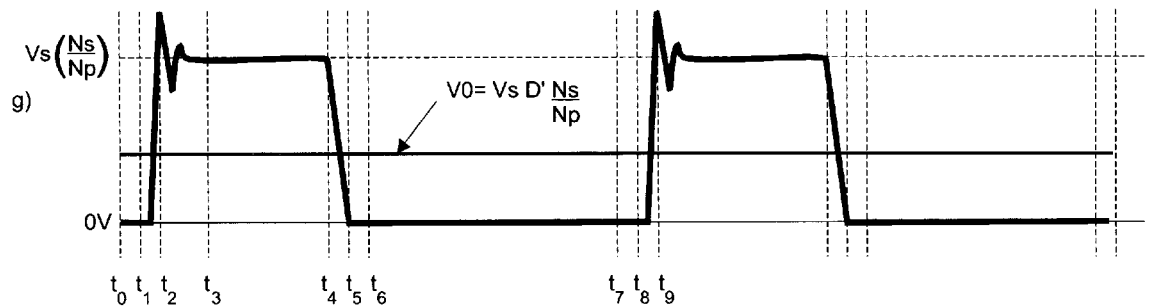
FIG. 8 is a set of voltage waveforms of the embodiment of the invention of FIG. 1.

The basic schematic of one embodiment of the invention is shown in FIG. 1. The converter is connected to a voltage source Vs by input terminals. Two capacitors C1 and C2 block any DC from the transformer T1. The capacitors C1 and C2 are connected in series with the primary winding and a small value inductor $L_R$. With respect to the capacitors C1 and C2 could be replaced with a single capacitor connected to either input terminal, with the missing capacitor replaced by an open circuit (as illustrated in FIG. 1A). The series connection between inductor $L_R$ and the primary winding need not be in the specific order shown in the drawing provided they are in series with one another. $L_R$ could also be placed in series with the secondary winding rather than the primary winding. Where a single capacitor C1 or C2 is used rather than two capacitors, then the series connection between that single capacitor, $L_R$ and the primary winding can be in any order.

Two controlled switches S1 and S2, typically MOSFETs, connected in series are also connected in parallel to the source Vs. These switches have diodes $D_{S1}$ and $D_{S2}$ placed across them in such a direction that allows current to flow in the opposite direction to the switches. If MOSFETS were used for S1 and S2 then integral diodes inherent in them can be utilized as $D_{S1}$ and $D_{S2}$. Capacitors $C_{S1}$ and $C_{S2}$ are also placed across S1 and S2 respectively and similarly can be partly or completely realized by the MOSFET capacitance.

The series combination of a small value inductor $L_R$ and primary winding of transformer T1 is connected between the common point of the capacitors C1 and C2 and the common point of the switches S1 and S2. In this and other embodiments described herein, inductor $L_R$ can be partly or completely realized by the leakage inductance of the transformer.

The secondary of the transformer is connected in series with a DC blocking capacitor C3. One end of the series combination is connected to one end of an output inductor Lo. An output diode is connected across the series combination of C3 and the secondary winding. An output capacitor Co is connected across the output terminals or load $R_L$ and one end of Co is connected to the second end of output inductor Lo.

Another embodiment of the invention is shown in FIG. 2. Two identical half bridges of controlled switches are used. A capacitor C1 is connected in series with $L_R$ and primary of the transformer T1 to block DC voltage from the transformer primary. The switch S4 is operated at the same time as S1 and similarly S3 is operated at the same time as S2. The balance of this embodiment is the same as the first embodiment.

In the embodiment of FIG. 3, a lossless voltage clamp is added across output diode D7 consisting of a clamping capacitor C4 connected in series with diode means D5. D5 is poled to conduct current in the opposite direction to the normal direction of current flow in the output diode. Anti-parallel diode D5 and small valued capacitor $C_{S5}$ is connected in a manner identical to that of the primary switches. A controlled switch S5 is connected across said diode means and poled to conduct current in the opposite direction to the normal direction of current in the diode means when the controlled switch is turned on. S5 is operated at the same time as S1 except that a larger time delay on turn on is employed. This arrangement may be used in conjunction with the half bridge embodiment of FIG. 1 or the full bridge embodiment of FIG. 2. One disadvantage of this circuit is a relatively large current flowing in S5, but it can be substantially reduced by a further aspect of the invention shown in FIG. 4.

In the circuit of FIG. 4, a coupled tap up winding is added to inductor Lo and diode D6 is added in series with the winding. Switch means comprising S5 and Cs5 is connected to the other end of this diode rather than to the cathode of diode D7, with the other end of the switch being connected to the common point between D5 and the clamping capacitor C4. Typically the tap up winding will be 5 to 15% of the number of turns on the main winding of the inductor. This aspect of the invention both reduces the time that the clamp current flows in D5 and substantially reduces the current through S5 at the expense of a slightly higher voltage on S5 when S2 is on. S5 and D6 are poled to conduct current from C4 to the output inductor when S5 is ON.

FIG. 5 shows a typical circuit to create the duty cycle controlled rectangular waveforms used to control switch S1, S2 and S3. A pulse width modulator, whose duty cycle output is responsive to a control input, creates the waveform for S1. An inverter is used to cause a complimentary waveform for switch S2. Slight time delays are introduced to the rising time of the two drive waveforms to allow the voltage in the switches S1 and S2 to come to zero before these switches are turned on. Switch S5 is turned on when the voltage across it is zero and turned off at the same time as switch S1.

The circuit operation of the last shown embodiment (FIG. 4) being a preferred embodiment of the invention is described following with reference to FIG. 6 and FIG. 7, both representing full load operation.

The gate drive waveforms for controlled switches S1 and S2 are shown in FIGS. 6a and 6b respectively. They are non-overlapping complimentary waveforms with duty cycle d and (1−d) and can be generated with the drive circuit shown in FIG. 5. The resulting voltage waveform of the common point of switches S1 and S2 is shown in FIG. 6c. This is a trapezoidal waveform with Period T, on time of S1 Ton, and duty cycle D=Ton/T. This voltage is equal to Vs when S1 is on and approximately 0 v when S2 is on and transitions roughly linearly between these values when both switches are off at a rate depending upon the switch currents at turn off and the value of Cs1 and Cs2. Both switches are turned on and off when the voltage across them is approximately zero. FIG. 6d shows the voltage at the common point of LR and the primary of T1 with respect to the negative (common) terminal of Vs. There is a delay on the positive going edge of this waveform caused by the commutation time required to slew the current to zero in the output diode D7. This results in a reduced effective on time, Ton'. Subsequent to this there is a slight overvoltage during the time clamp diode D5 conducts. This overvoltage reduces when D5 finishes conducting and D6 and S5 starts to conduct. This waveform voltage goes to approximately zero when S1 turns off. The voltage at the common point of C1 and C2 (FIG. 6c) adapts to duty cycle changes so that there is no DC voltage across the transformer. Thus the transformer primary voltage waveform (FIG. 6e) is identical to FIG. 6d, but is bipolar in nature with no DC component. The voltage across the secondary of the transformer (FIG. 6f) is identical to the primary voltage waveform except it is changed in magnitude by the transformer turns ratio. The voltage at the cathode of D7 with respect to the output circuit common (Vo−) is shown in FIG. 6g. This waveform is the same amplitude as the transformer secondary waveform and is essentially the same shape but is unpopular as a result of the rectification action of D7 and DC blocking capacitor C3. This waveform is averaged by the output filter consisting of Lo and Co to create the output voltage Vo. The load R1 is connected across the output capacitor Co. The output voltage is proportional to the effective duty cycle D':

$$Vo = Vs\frac{Ns}{Np}D' \quad \text{or} \quad Vo = Vs\frac{Ns}{Np}KD$$

The commutation duty cycle loss factor K is proportional to the output current and is typically 0.9 or greater. Thus the converter is a buck derived type.

The voltage at the other end of Lo is shown in FIG. 6h. This voltage waveform is slightly larger than that at the D7 cathode, due to the tap up winding, and goes slightly negative. Capacitor C4 is sized such that its voltage is essentially constant at the peak value of the D7 cathode voltage. The voltage across S5 is shown in FIG. 6j. It is an invented version of the Lo tap voltage due to the relative connection of S5, with the negative portion of the waveform, when D5 is conducting, blocked by D6. FIG. 6k shows the gate drive voltage of S5 which caused S5 to turn on during the time D5 is conducting and to turn off at the same time as S1. Thus switch S5 is also zero voltage switched.

The current waveforms of this embodiment of the invention is shown in FIG. 7 also for full load condition. FIG. 7a shows the current through the parallel combination of S1 and Ds1. When the voltage across S1 and Ds1 becomes zero the current initially flows through Ds1 during which time S1 is turned on. The current ramps up quickly, flowing through S1 when it changes polarity. Initially this current overshoots due to the reverse current of diode D7 during it's reverse recovery time, and then ramps downward as D5 conducts until D5 conduction cease, then it ramps upwards due to the finite inductance of Lo and magnetizing inductance of T1. The current in S1 ceases abruptly when S1 is turned off by it's gate drive signal (FIG. 6a). The current flowing in Lr and the primary of T1 then flows through Cs1 and Cs2, as shown in FIG. 7b, and causes the slewing of the switch voltage (FIG. 6c). When the voltage across S2 becomes zero the current ceases in Cs1 and Cs2 and flows through diode Ds2 as shown in FIG. 7c. This current slowly ramps up and switch S2 is turned on before the current changes polarity. This current increases semi-sinusoidally through S2 until it is stopped abruptly when switch S2 is turned off by the gate drive waveform FIG. 6b. Subsequently the current through Lr and the primary of T1 (shown in FIG. 7d) runs briefly through Cs1 and Cs2 until S1 and Ds1 again conducts. The current through the primary of T1 is a combination of the current waveforms of FIG. 7a, FIG. 7b and the inverse of FIG. 7c.

The current through the secondary of T1 is similar to FIG. 7d except scaled in amplitude by the turns ratio of the transformer and minus the small contribution of the magnetizing current of T1. The current through diode D7 is shown in FIG. 7e. The current starts at zero when S2−Ds2 conduct then ramps semi-sinusoidually upwards. It starts to ramp downwards when S2 turns off and ramps down more rapidly when S1 conducts. The current then becomes somewhat negative due to it's inherent reverse recovery time then quickly returns to zero. This reverse current causes extra energy to be stored in Lr which causes the voltage on the cathode of D7 to overshoot and D5 to conduct in a triangular fashion as shown in FIG. 7f. When this current reaches zero, switch S5 and diode D6 conduct the current shown in FIG. 7g, which subsequently stops abruptly when S5 and S1 are turned off.

The current through the main winding Lo and the output current are shown in FIG. 7h. The current through Lo is the normal output inductor current for a buck derived converter being non-pulsating DC with a small triangular ripple.

The operation at lighter loads is similar except at typically between one half to one quarter full load complete zero voltage switching of S1 is lost and is replaced by partial hard-switching. This is not a serious drawback as the conduction losses are relatively small at these loads and make up for the increased switching losses. Switches S2 and S5 zero voltage switch for all loads. To achieve voltage regulation at no load the duty cycle of S1 is reduced towards zero. Similarly the duty cycle can be reduced to effect output current limiting down to a short circuit on the output with zero voltage switching maintained for all controlled switches.

As can be seen from the circuit waveforms, the converter is a buck derived isolated converter featuring zero voltage switching of the controlled switches and zero current switching of the output non-controlled switch and having good components load factors. The load factor of the transformer is almost twice as good, and the S2 and D5 load factors are only slightly inferior to that of the active reset forward converter. Zero voltage switching of the controlled switch is achieved without the addition of a third controlled switch in series with the output.

The converter of the present invention has been found to have an output voltage proportional to the on time of switch S1, therefore it is a buck derived converter. It is easy to control and regulate, has no right half plane zero of the buck-boost or boost derived converters. It has a non-pulsating output current and is relatively simple and has good component load factors, especially of the transformer. It provides zero voltage switching of the controlled switches and zero current switching of the output non controlled switch without using a third series controlled switch. The converter is suitable for medium output voltages such as 48 Volts or 24 Volts though is not suitable for low output voltages such as 5 V due to the presence of the capacitor in series with the transformer secondary.

It will be appreciated by those skilled in the art that modifications to the preferred embodiments described herein, including electrical equivalents may be made without departing from the principles of the invention or the scope of the claims. For example, the tap winding of the output inductor can be realized with two separate coupled windings or with one winding with a tap connection. The transformer and one or even both of Lr and the output inductor could be integrated into one structure. A lossy type voltage clamping means for the output diode could be employed rather than the lossless type preferred. The polarities of the diodes and controlled switches could also be reversed on the input and/or output thereby allowing operation of the circuits with negative input and/or output voltages. Also, additional circuit elements, well known by those skilled in the art, such as RC dampers on certain elements may be necessary to achieve optimum operation of invention. In addition, a saturable reactor may be added in series with the output diode to limit the reverse recovery current in the output diode without departing from the scope of the invention or of the claims.

What is claimed is:

1. A switch mode DC to DC converter comprising input and output terminals, a transformer having a primary and a secondary windings, an input stage comprising a half bridge arrangement of asymmetrically controlled switches, at least one DC blocking capacitor in series with said primary winding, and an output stage having an output capacitor with one end connected to a first end of an output inductor and the output capacitor being connected in parallel with the output terminals, and further including a secondary DC blocking capacitor in series with the secondary winding and one end of the series combination of secondary DC blocking capacitor and secondary winding being connected to a second end of the output inductor, and an output diode connected across the series combination of the secondary winding and the secondary DC blocking capacitor.

2. A switch mode DC to DC converter as in claim 1 wherein said half bridge arrangement of asymmetrically controlled switches comprises two controlled switches connected in series with one another, the series combination of controlled switches being connected in parallel with the input terminals, switch control means for causing said controlled switches to be operated asymmetrically, and antiparallel diode means associated with each of said controlled switches, said antiparallel diode means being poled so as to allow current to flow in a direction opposite to the normal direction of flow of current in each controlled switch, and wherein said input stage comprises inductor means in series with said primary winding and said primary DC blocking capacitor, said series combination of inductor means, primary winding and primary DC blocking capacitor being connected between one of the input terminals on the one hand and the common point of said two controlled switches on the other hand.

3. A switch mode DC to DC converter as in claim 2 wherein a first end of said primary DC blocking capacitor is connected to said input terminal and a second end of said primary DC blocking capacitor is connected to the series combination of said inductor means and primary winding.

4. A switch mode DC to DC converter as in claim 3 comprising a second primary DC blocking capacitor connected between the other input terminal and said second end of said primary DC blocking capacitor.

5. A switch mode DC to DC converter comprising a full bridge arrangement of asymmetrically controlled switches, input and output terminals, a transformer having a primary and a secondary windings, a primary DC blocking capacitor in series with said primary winding, and an output stage having an output capacitor with one end connected to a first end of an output inductor and the output capacitor being connected in parallel with the output terminals, and further including a secondary DC blocking capacitor in series with the secondary winding and one end of the series combination of secondary DC blocking capacitor and secondary winding being connected to a second end of the output inductor, and an output diode connected across the series combination of the secondary winding and the secondary DC blocking capacitor.

6. A switch mode DC to DC converter as in claim 5 wherein said full bridge arrangement of controlled switches comprises two controlled switches connected in series with one another, said series combination of controlled switches being connected in parallel with the input terminals, a further two controlled switches being connected in series with one another and the series combination of said further two switches being connected in parallel with the input terminals, switch control means for causing the pair of controlled switches to be operated asymmetrically to the pair of further controlled switches, and for causing each of the two pairs to be operated in opposition to the other, antiparallel diode means associated with each of said switches, said antiparallel diode means being poled so as to allow current to flow in a direction opposite to the normal direction of flow of current in each switch, inductor means in series with said primary winding and said primary DC blocking capacitor, said series combination of primary DC blocking capacitor, inductor and primary winding being connected between the common point of said two controlled switches on the one hand and the common point of said two further controlled switches on the other hand.

7. A switch mode DC to DC converter as in claim 1, 2, 3, 4, 5 or 6 further comprising a series combination of clamp diode means and a clamping capacitor being connected across said output diode, said clamp diode means being poled to conduct current in the opposite direction to the normal direction of current flow in the output diode, and a controlled energy recovery switch connected across said clamp diode means and poled to conduct current in the opposite direction to the normal direction of current in the clamp diode means when said controlled switch is turned ON.

8. A switch mode DC to DC converter comprising a half bridge arrangement of asymmetrically controlled switches, input and output terminals, a transformer having a primary and a secondary windings, a primary DC blocking capacitor in series with said primary winding, and an output stage having an output capacitor with one end connected to a first end of an output inductor and the output capacitor being connected in parallel with the output terminals, and further including a secondary DC blocking capacitor in series with said secondary winding, one end of said series combination of secondary DC blocking capacitor and secondary winding being connected to a tap on the output inductor, and an output diode connected across the series combination of the secondary winding and the secondary DC blocking capacitor, and said converter further comprising a series combination of first diode means and a clamping capacitor said series combination being connected across said output diode, one end of said first diode means being connected to said tap and said first diode means being poled to conduct current in the opposite direction to the normal direction of current flow in the output diode, a controlled energy recovery switch in series with second diode means, said series combination of energy recovery switch and second diode means being connected from the common point between said first diode means and said clamping capacitor on the one hand and a second end of the output inductor on the other hand, both said energy recovery switch and said second diode means being poled to conduct current from the clamping capacitor to the output inductor when said energy recovery switch in ON.

9. A switch mode DC to DC converter comprising a full bridge arrangement of asymmetrically controlled switches, input and output terminals, a transformer having a primary and a secondary windings, and an output stage having an output capacitor with one end connected to a first end of an output inductor and the output capacitor being connected in parallel with the output terminals, and further including a secondary DC blocking capacitor in series with the secondary winding, one end of said series combination of secondary DC blocking capacitor and secondary winding being connected to a tap on the output inductor, and an output diode connected across the combination of the secondary winding and the secondary DC blocking capacitor, and said converter further comprising a series combination of first diode means and a clamping capacitor said series combination of first diode means and clamping capacitor being connected across said output diode, one end of said first diode means being connected to said tap and said first diode means being poled to conduct current in the opposite direction to the normal direction of current flow in the output diode, a controlled energy recovery switch in series with second diode means, said series combination of energy recovery switch and second diode means being connected from the common point between said first diode means and said clamping capacitor on the one hand and a second end of the output inductor on the other hand, both said energy recovery switch and said second diode means being poled to conduct current from the clamping capacitor to the output inductor when said energy recovery switch in ON.

10. A switch mode DC to DC converter as in claim 7 further comprising switch control means for controlling the operation of said controlled energy recovery switch such that it is closed at substantially the same time as one of said controlled switches.

11. A switch mode DC to DC converter as in claim 8 wherein said half bridge arrangement of asymmetrically controlled switches comprises two controlled switches connected in series with one another, the series combination of controlled switches being connected in parallel with the input terminals and diode means associated with each of said controlled switches, said diode means being poled so as to allow current to flow in a direction opposite to the normal direction of flow of current in each controlled switch, and wherein the input stage comprises inductor means in series with said primary winding and said primary DC blocking capacitor, said series combination of inductor means, primary winding and input capacitor being connected between one of the input terminals on the one hand and the common point of said two controlled switches on the other hand.

12. A switch mode DC to DC converter as in claim 11 wherein a first end of said primary DC blocking capacitor is connected to said input terminal and a second end of said primary DC blocking capacitor is connected to the series combination of said inductor means and primary winding.

13. A switch mode DC to DC converter as in claim 12 comprising a second primary DC blocking capacitor connected between the other input terminal and said second end of said primary DC blocking capacitor.

14. A switch mode DC to DC converter as in claim 9 further comprising two controlled switches connected in series with one another, said series combination of controlled switches being connected in parallel with the input terminals, a further two controlled switches being connected in series with one another and the series combination of said further two switches being connected in parallel with the input terminals, antiparallel diode means associated with each of said switches, said antiparallel diode means being poled so as to allow current to flow in a direction opposite to the normal direction of flow of current in each switch, a capacitor and inductor means in series with said primary winding, said series combination of capacitor, inductor means and primary winding being connected between the common point of said two controlled switches on the one hand and the common point of said two further controlled switches on the other hand.

15. A switch mode DC to DC converter as in any one of claims 2, 6, 11 or 14 further comprising a discrete capacitor connected across each of said controlled switches.

16. A switch mode DC to DC converter as in claim 2, 6, 11 or 14 wherein said inductor means is a discrete inductor in series with said primary winding.

17. A switch mode DC to DC converter as in claim 2, 6, 11 or 14 wherein said inductor means is realized as the leakage inductance of the transformer.

18. A switch mode DC to DC converter as in claim 2, 6, 11 or 14 wherein said inductor means is a discrete inductor in series with said secondary winding.

19. A switch mode DC to DC converter as in claim 8 or 9 further comprising switch control means for controlling the operation of said controlled energy recovery switch such that it is closed at substantially the same time as one of said controlled switches.

20. A switch mode DC to DC converter comprising input and output terminals, a transformer having a primary and a secondary windings, an input stage comprising a half bridge arrangement of asymmetrically controlled switches, at least one capacitor operative for blocking DC through said primary winding, and an output stage having an output capacitor with one end connected to a first end of an output inductor and the output capacitor being connected in parallel with the output terminals, and further including a secondary DC blocking capacitor in series with the secondary winding and one end of the series combination of secondary DC blocking capacitor and secondary winding being connected to a second end of the output inductor, and an output diode connected across the series combination of the secondary winding and the secondary DC blocking capacitor.

21. A switch mode DC to DC converter as in claim 20 wherein said half bridge arrangement of asymmetrically controlled switches comprises two controlled switches connected in series with one another, the series combination of controlled switches being connected in parallel with the input terminals, switch control means for causing said controlled switches to be operated asymmetrically, and antiparallel diode means associated with each of said controlled switches, said antiparallel diode means being poled so as to allow current to flow in a direction opposite to the normal direction of flow of current in each controlled switch, and wherein said input stage comprises inductor means in series with said primary winding and said input stage capacitor, said series combination of inductor means, primary winding and input stage capacitor being connected between one of the input terminals on the one hand and the common point of said two controlled switches on the other hand.

22. A switch mode DC to DC converter as in claim 21 wherein a first end of said input stage capacitor is connected to said input terminal and a second end of said input stage capacitor is connected to the series combination of said inductor means and primary winding.

23. A switch mode DC to DC converter as in claim 22 wherein said input stage further comprises a second capacitor operative for blocking DC through said primary winding, said second capacitor being connected between the other input terminal and said second end of said first input stage capacitor.

* * * * *